US012806808B2

(12) United States Patent
Moura Cirilo Rocha et al.

(10) Patent No.: US 12,806,808 B2
(45) Date of Patent: Nov. 24, 2026

(54) AUTOMATIC BIN DETECTION FOR ROBOTIC APPLICATIONS

(71) Applicant: Siemens Aktiengesellschaft, Munich (DE)

(72) Inventors: Eduardo Moura Cirilo Rocha, Albany, CA (US); Husnu Melih Erdogan, Berkeley, CA (US); Eugen Solowjow, Berkeley, CA (US); Ines Ugalde Diaz, Redwood City, CA (US); Yash Shahapurkar, Berkeley, CA (US); Nan Tian, Foster City, CA (US); Paul Andreas Batsii, Bernau a. Chiemsee (DE); Christopher Schuette, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 402 days.

(21) Appl. No.: 18/366,079

(22) Filed: Aug. 7, 2023

(65) Prior Publication Data

US 2024/0066723 A1 Feb. 29, 2024

(30) Foreign Application Priority Data

Aug. 30, 2022 (EP) .................................... 22192858

(51) Int. Cl.
*B25J 19/02* (2006.01)
*B25J 9/16* (2006.01)
*B65G 1/04* (2006.01)

(52) U.S. Cl.
CPC .......... *B25J 19/023* (2013.01); *B25J 9/1697* (2013.01); *B65G 1/04* (2013.01)

(58) Field of Classification Search
CPC .......... B25J 19/023; B25J 9/1697; B65G 1/04
See application file for complete search history.

(56) References Cited

U.S. PATENT DOCUMENTS

2012/0195471 A1 8/2012 Butler et al.
2020/0122321 A1 * 4/2020 Khansari Zadeh .... B25J 9/1697

FOREIGN PATENT DOCUMENTS

CN 114912287 A 8/2022

OTHER PUBLICATIONS

Katsoulas Dimitrios: "Localization of Piled Boxes by Means of the Hough Transform", "Michaelis, B., Krell, G. (eds) Pattern Recognition. DAGM 2003. Lecture Notes in Computer Science", Jan. 1, 2003 (Jan. 1, 2003), Springer Berlin Heidelberg, Berlin, Heidelberg, XP093012143, ISSN: 0302-9743, ISBN: 978-3-540-45243-0, vol. 2781, pp. 44-51, DOI: 10.1007/978-3-540-45243-0_7, Retrieved from the Internet: URL:https://lmb.informatik.uni-freiburg.de /people/dkats/Papers/dagm03.pdf>.

(Continued)

*Primary Examiner* — Allen C Chein

(57) ABSTRACT

It is recognized It is recognized herein that current approaches to robotic picking lack efficiency and capabilities. In particular, current approaches often do not properly or efficiently estimate the pose of bins, due to various technical challenges in doing so, which can impact grasp computations and overall performance of a given robot. The pose of the bin can be determined or estimated based on depth images. Such bin pose estimation can be performed during runtime of a given robot, such that grasping can be enhanced due to the bin pose estimations.

4 Claims, 7 Drawing Sheets

(56) References Cited

OTHER PUBLICATIONS

Gajdosech, Lukas et al: "Towards Deep Learning-based 6D Bin Pose Estimation in 3D Scans", arxiv.org, Cornell University Library, 201 Olin Library Cornell University Ithaca, NY 14853, Dec 17, 2021 (Dec. 17, 2021), XP091117907.

* cited by examiner

500

```
Class Dataset
{
  Data members:
    Set of points.
}

Class ModelInterface
{
  Methods:
    fit(Dataset)       -> fit the model given a Dataset object.
    residuals(Dataset) -> compute the residual for all points in a Dataset object for
                          the fitted model.
    error(Dataset)     -> compute the overall error over an entire Dataset model for
                          the fitted model.  For e.g., RMS over residuals.
  Data members:
    Fitted model.
```

FIG. 5

AUTOMATIC BIN DETECTION FOR ROBOTIC APPLICATIONS

BACKGROUND

Autonomous operations, such as robotic grasping and manipulation, in unknown or dynamic environments present various technical challenges. Autonomous operations in dynamic environments may be applied to mass customization (e.g., high-mix, low-volume manufacturing), on-demand flexible manufacturing processes in smart factories, warehouse automation in smart stores, automated deliveries from distribution centers in smart logistics, and the like. In order to perform autonomous operations, such as grasping and manipulation, in some cases, robots may learn skills using machine learning, in particular deep neural networks or reinforcement learning.

In particular, for example, robots might interact with different objects under different situations. Some of the objects might be unknown to a given robot. Bin picking is an example operation that robots can perform using AI. Bin picking refers to a robot grasping objects that can define random or arbitrary poses, from a container or bin. The robot can move or transport the objects, and place them at a different location for packaging or further processing. It is recognized herein, however, that current approaches to robotic picking lack efficiency and capabilities. In particular, current approaches often do not properly or efficiently estimate the pose of bins, due to various technical challenges in doing so, which can impact grasp computations and overall performance of a given robot.

BRIEF SUMMARY

Embodiments of the invention address and overcome one or more of the described-herein shortcomings or technical problems by providing methods, systems, and apparatuses for determining the pose of bin. Such bin pose estimation can be performed during runtime of a given robot, such that grasping can be enhanced due to the bin pose estimations.

In an example aspect, an autonomous system includes a robot configured to operate in an active industrial runtime so as to define a runtime. The robot includes an end effector configured to grasp a plurality of objects within a workspace. The autonomous system can include a depth camera configured to capture a depth image of the workspace. The autonomous system further includes a processor and a memory storing instructions that, when executed by the processor, cause the autonomous system to perform various operations. For example, the system can detect a bin within the workspace, wherein the bin is capable of containing one or more of the plurality of objects. Based on the depth image, the system can determine a pose of the bin. The pose can define an orientation of the bin within the workspace.

In an example, the bin defines a bottom end and a top end opposite the bottom end along a transverse direction, wherein the bottom end is positioned farther from the depth camera along the transverse direction as compared to the top end. The top end can define an opening and sides of the bin around the opening such that the depth camera is further configured to capture the depth image of the bin from a perspective along the transverse direction. Based on the depth image, the system can generate a segmentation mask of the bin that defines pixels representative of the sides of the bin at the top end. The system can scan the segmentation mask along a first direction and a second direction substantially perpendicular to the first direction so as to identify a plurality of points on outermost edges of the segmentation mask. Further, the system can fit a plurality of models to a boundary defined by the plurality of points, so as to determine the pose of the bin.

BRIEF DESCRIPTION OF THE SEVERAL VIEWS OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 5 illustrates an example fitting operation that can be performed on the dataset object so as to generate the pose estimation.

DETAILED DESCRIPTION

Figure 1:
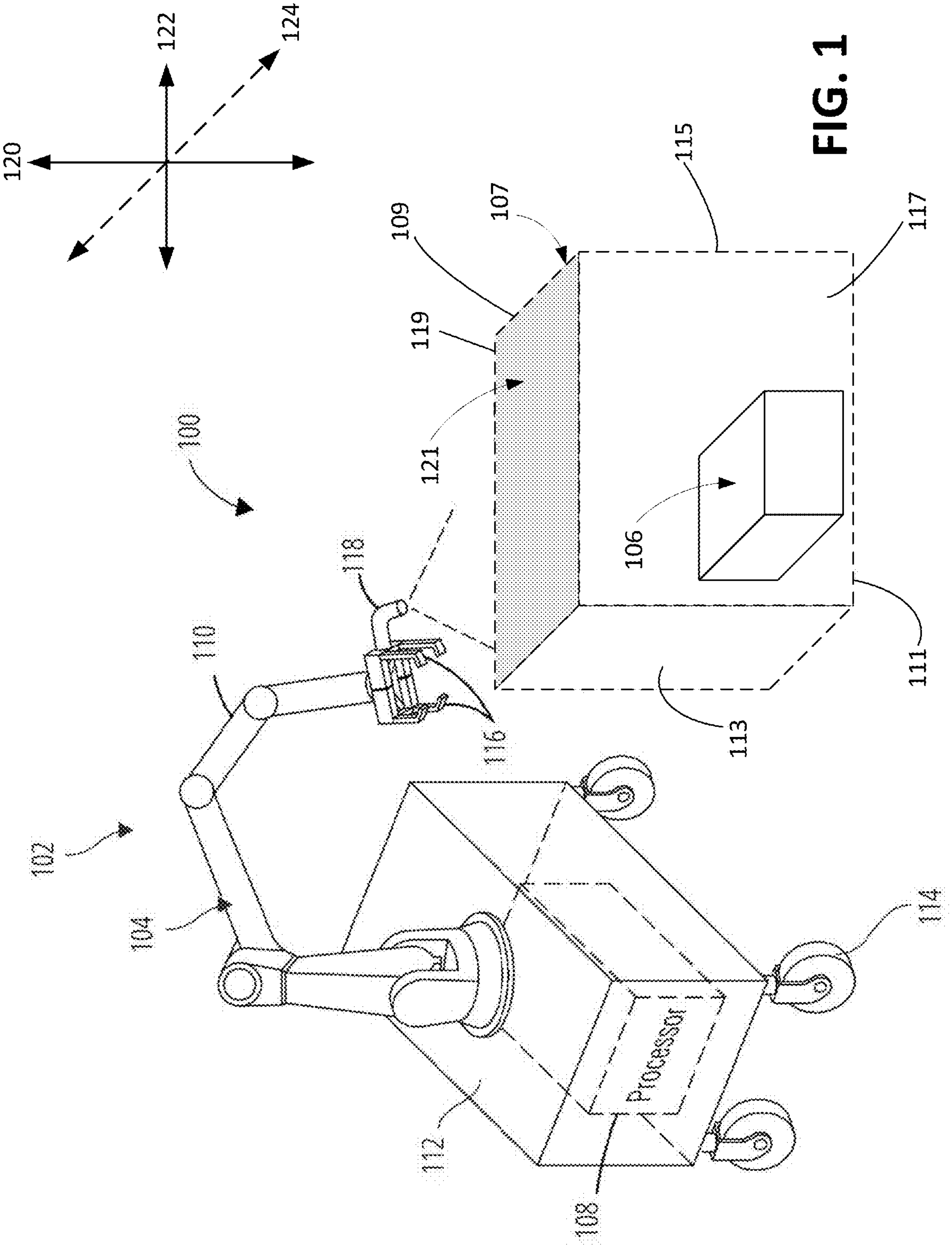
FIG. 1 shows an example autonomous system in an example physical environment that includes a bin capable of containing various objects, in accordance with an example embodiment.

As an initial matter, robotic bin picking generally consists of a robot equipped with sensors or cameras, such that the robot can grasp (pick) objects in random poses from a container (bin) using a robotic end effector. In various examples described herein, objects can be known or known to the robot, and objects can be of the same type or mixed. Furthermore, in various examples described herein, the position (pose) of a given bin that contains objects for picking by a robot might not be static or fixed relative to the robot. It is further recognized herein that, in some cases, if the position of the bin (bin pose) is estimated incorrectly, even if the bin pose estimation is relatively close to the actual bin pose, the resultant determination of the region of interest can be off, such that grasp computations that can depend on the region of interest can result in errors.

The position of various bins relative to robots might vary at a given time for various reasons. By way of some examples, operators might bump, swap, or otherwise move bins; bins might be carried by a conveyor system so as to change position or orientation; a given robot might be mounted on top of another mobile robot or otherwise change position relative to a bin; etc. In such situations in which a bin's position is not fixed, it is recognized herein that a given autonomous system might estimate the pose of the bin relative to the robot before a bin picking algorithm is performed so as to determine a grasp that the robot executes next. In addition to the dynamic nature of a given bin's pose or position, it is further recognized herein that there are challenges related to estimating a bin position. For example, information and data that are available for bin pose estimation is not always of good quality. In particular, it is recognized herein that detailed CAD models of the bins are often not available or known, the expected bin dimensions are not always accurate, 3D sensor data can be very noisy and of bad quality, or the like. Various embodiments described herein address such issues, among others, so as to perform precise bin pose estimations for various bins, for instance new bins that a given system has not previously encountered.

Example embodiments are often described herein in the context of bin pose estimation for robotic bin-picking implementations, though it will be understood that the bin pose estimations described herein can be implemented in a variety of applications, for instance tray-stacking or sorting and placing applications, and all such applications for the bin pose estimations described herein are contemplated as being within the scope of this disclosure. Embodiments described herein can address challenges related to noisy sensor data, lack of accurate system information (e.g., bin dimensions), and the like so to perform accurate bin pose estimations for various bins in various positions.

By way of further background, it is recognized here that various commercial bin-picking solutions or systems rely on a known static bin pose, and thus do not contemplate various issues addressed herein. Instead, such commercial systems can ensure that bins are always in the same position, such that the bin pose is known or predetermined. It is further recognized herein, however, that such systems typically require complex integration and are less flexible and adaptable to different bins. In some cases, traditional CAD-based pose estimation algorithms can be used to estimate bin poses, for example, when CAD models of bins are available. It is recognized herein, however, that such CAD models are rarely available for commercial applications, and obtaining such models adds integration steps for the end user every time a new type of bin is to be introduced into a given system, which can quite frequently. Furthermore, such methods that involve CAD models of bins can also be computationally expensive and not appropriate when used with noisy low-cost sensor data. Further still, it is recognized herein that adding artificial markers to the bins, so that poses can be estimated via the markers, can make pose estimation computationally efficient. It is further recognized herein, however, that the integration cost of adding such markers can be burdensome or infeasible in real-world scenarios, for example, because all bins often must be adapted to the bin picking system that uses markers.

Referring now to FIG. 1, an example industrial or physical environment or workspace 100 is shown. As used herein, a physical environment or workspace can refer to any unknown or dynamic industrial environment. Unless otherwise specified, physical environment and workspace can be used interchangeably herein, without limitation. A reconstruction or model may define a virtual representation of the physical environment or workspace 100, or one or more objects 106 within the physical environment 100. For purposes of example, the object 106 can be disposed in a bin or container, for instance a bin 107, so as to be positioned for grasping. Unless otherwise specified herein, bin, container, tray, box, or the like can be used interchangeably, without limitation. By way of example, the object 106 can be picked from the bin 107 by one or more robots, and transported or placed in another location, for instance outside the bin 107. The example object 106 is illustrated as a rectangular object, for instance a box, though it will be understood that the objects 106 can be alternatively shaped or define alternative structures as desired, and all such objects are contemplated as being within the scope of this disclosure.

The physical environment 100 can include a computerized autonomous system 102 configured to perform one or more manufacturing operations, such as assembly, transport, or the like. The autonomous system 102 can include one or more robot devices or autonomous machines, for instance an autonomous machine or robot device 104, configured to perform one or more industrial tasks, such as bin picking, grasping, or the like. The system 102 can include one or more computing processors configured to process information and control operations of the system 102, in particular the autonomous machine 104. The autonomous machine 104 can include one or more processors, for instance a processor 108, configured to process information and/or control various operations associated with the autonomous machine 104. An autonomous system for operating an autonomous machine within a physical environment can further include a memory for storing modules. The processors can further be configured to execute the modules so as to process information and generate models based on the information. It will be understood that the illustrated environment 100 and the system 102 are simplified for purposes of example. The environment 100 and the system 102 may vary as desired, and all such systems and environments are contemplated as being within the scope of this disclosure.

Still referring to FIG. 1, the autonomous machine 104 can further include a robotic arm or manipulator 110 and a base 112 configured to support the robotic manipulator 110. The base 112 can include wheels 114 or can otherwise be configured to move within the physical environment 100. The autonomous machine 104 can further include an end effector 116 attached to the robotic manipulator 110. The end effector 116 can include one or more tools configured to grasp and/or move objects 106. Example end effectors 116 include finger grippers or vacuum-based grippers. The robotic manipulator 110 can be configured to move so as to change the position of the end effector 116, for example, so as to place or move objects 106 within the physical environment 100. The system 102 can further include one or more cameras or sensors 118, for instance a three-dimensional (3D) point cloud camera, configured to detect or record objects 106 within the physical environment 100. The cameras or sensors 118 can be mounted to the robotic manipulator 110 or otherwise configured to generate a 3D point cloud of a given scene, for instance the physical environment 100. Alternatively, or additionally, the one or more cameras of the system 102 can include one or more standard two-dimensional (2D) cameras that can record or capture images (e.g., RGB images or depth images) from different viewpoints. Those images can be used to construct 3D images. For example, a 2D camera can be mounted to the robotic manipulator 110 so as to capture images from perspectives along a given trajectory defined by the manipulator 110.

Still referring to FIG. 1, the camera or sensor 118 can be configured to capture images of the bin 107, and thus the objects 106, along a first or transverse direction 120. The camera or sensor 118 can define a depth camera configured to capture depth images of the workspace 100 from a perspective along the transverse direction 120. For example, the bin 107 can define a top 109 end and a bottom end 111 opposite the top end 109 along the transverse direction 120. The bin 107 can further define a first side 113 and a second side 115 opposite the first side 113 along a second or lateral direction 122 that is substantially perpendicular to the transverse direction 120. The bin 107 can further define a front end 117 and a rear end 119 opposite the front end 117 along a third or longitudinal direction 124 that is substantially perpendicular to both the transverse and lateral directions 120 and 122, respectively. Though the illustrated bin 107 defines a rectangular shape, it will be understood that bins or containers can be alternatively shaped or sized, and all such bins or containers are contemplated as being within the scope of this disclosure.

Figure 2:
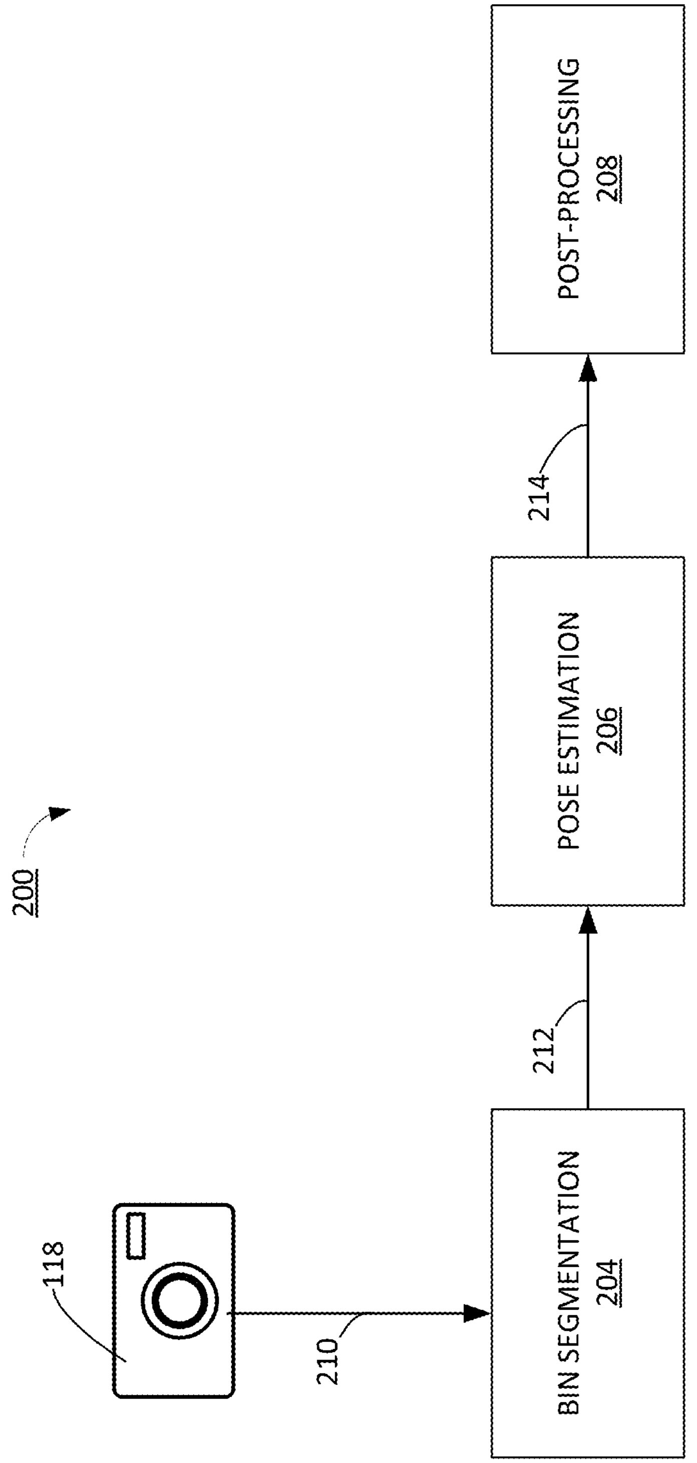
FIG. 2 illustrates an example computing system of the autonomous system configured to determine or estimate poses of bins, in accordance with an example embodiment.

Referring also to FIG. 2, the autonomous system 102 can define various computing systems, for instance an example computing system 200 that can include a depth camera, for instance the camera 118, which can be configured to generate depth images of a particular scene, for instance the scene defined by the physical environment or workspace 100. Alternatively, or additionally, the example computing system 200 can include multiple cameras 118 configured to generate depth images and color images of a particular scene. The autonomous system 102 can define various computing systems, such as the computing system 200, which can include various modules communicatively coupled to each other, for instance a bin segmentation module 204, a pose estimation module 206, and a post-processing module 208.

Figure 3:
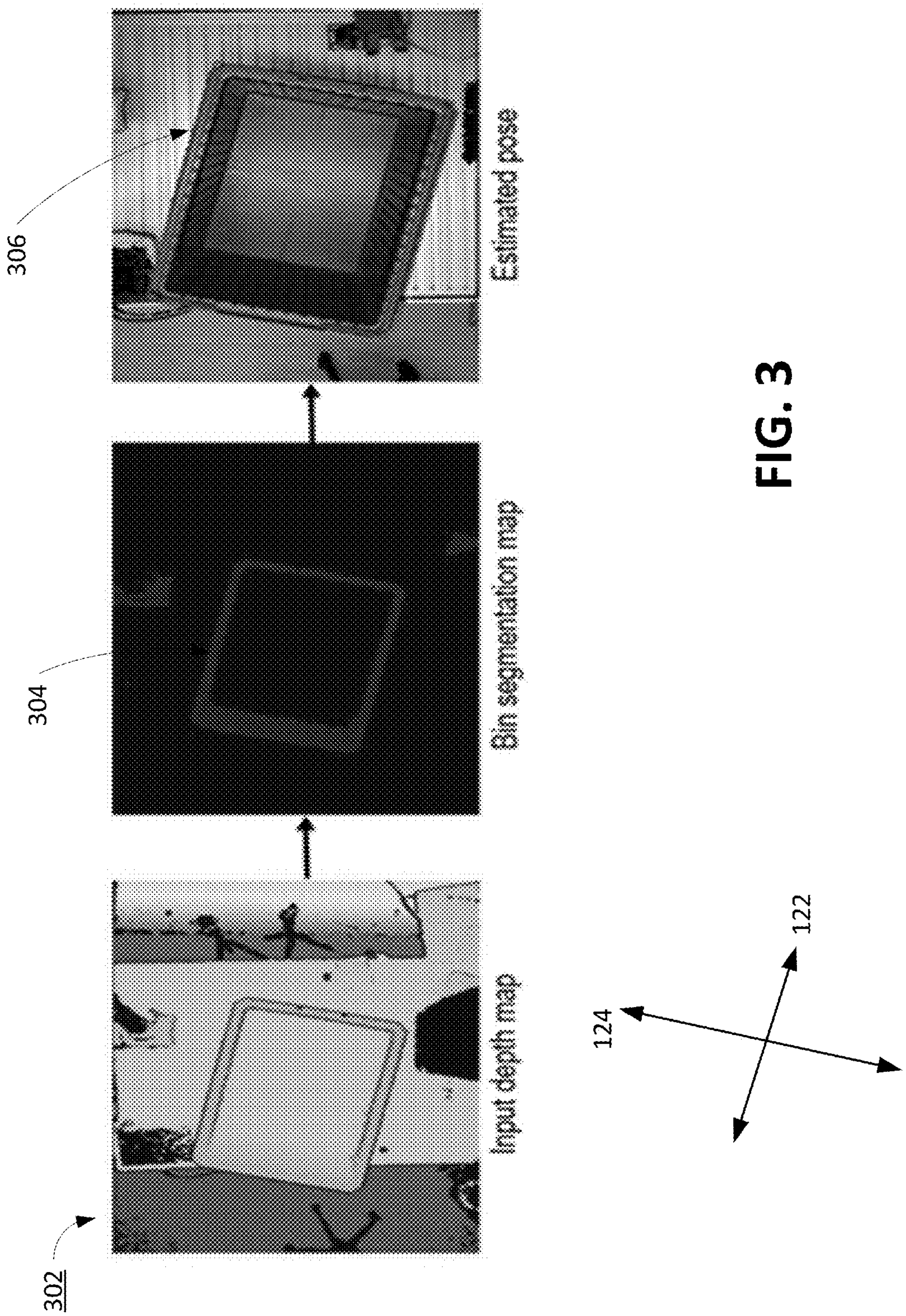
FIG. 3 illustrates an example depth map, bin segmentation mask, and estimated pose, which can be generated by the systems illustrated in FIGS. 1 and 2, in accordance with an example embodiment.

Referring to FIGS. 1-3, in an example, the bin segmentation module 204 obtains a depth image of a workspace, for instance a depth map or image 302 that includes the bin 107, at 210. In some examples, a user of the system 102 can select a rough search area for the bin 107 within a frame of the camera 118, for instance within the depth map 302. Such a selection can, in some cases, define a bin search so as to increase the accuracy of the bin segmentation module 204. In other examples, the bin search area is not defined and the bin segmentation module 204 can search the entire depth map 302 for the bin 107. In various examples, the system 200 can detect the bin 107 within the workspace 100 based on the depth image. In some cases, the sensors 118 define consumer grade low-cost RGB-D sensors configured to capture depth maps, for instance the depth image 302. The bin segmentation module 204 can generate pixel-wise segmentation masks of bins based on depth images of bins. For example, based on the depth image 302 of the bin 107, the bin segmentation module 204 can perform bin segmentation on the bin 107 so as to generate a pixel-wise segmentation mask 304 of the bin 107. In various examples, the bin segmentation module 204 can generate pixel-wise segmentation masks that only include the sides of the bin, or that include the sides and interior of the bin. For example, at 212, the bin segmentation module 204 can generate the pixel-wise segmentation mask 304 such that the pixel-wise segmentation mask 304 includes respective sides of the bin 107 defined by the front end 117, rear end 119, first side 113, and second side 115. Additionally, the bin segmentation module 204 can generate the pixel-wise segmentation mask 304 such that the pixel-wise segmentation mask 304 also includes an interior of the bin 107 defined by the bottom end 111.

In an example, the bin segmentation module 204 obtains the distance between a sensor, for instance the sensor 118, to a work surface, for instance the surface that supports the bottom end 111, along the transverse direction 120. Such a distance can be measured, input into the bin segmentation module 204 as a known value based on the given autonomous system 102, or determined based on a depth image captured by the sensor 118. Additionally, or alternatively, the bin segmentation module 204 can obtain the bin height. The bin height can be measured along the transverse direction 120, input into the bin segmentation module 204 as a known value based on the given bin 107, or determined based on a depth image captured by the sensor 118. In various examples, the bin height is defined as the distance along the transverse direction 120 from the work surface (e.g., table) or the bottom end 111 to the top end 119. In some cases, the bin defines a bottom end 111 and a top end 109 opposite the bottom end 111 along the transverse direction 120, wherein the bottom end 111 is positioned farther from the depth camera 118 along the transverse direction 120 as compared to the top end 109. The top end 109 can define an opening 121 such that the depth camera 118 is further configured to capture the depth image of the bin 107 from a perspective along the transverse direction 120. Thus, the bin height can be defined as the distance 120 from the work surface or bottom end 111 to the top end 109 along the front end 117, rear end 119, first side 113, or second side 115. Furthermore, the top end 109 illustrated in the depth image 302 can be defined by the front end 117, rear end 119, first side 113, and second side 115. Based on the bin height and the distance from the sensor 118 to the work surface or bottom end 111, the bin segmentation module 204 can assign or classify pixels of the depth image 302 as bin pixels that illustrate or represent the bin 107 in the depth image 302. In an example in which the work surface or area (e.g., table) defines a plane that is substantially perpendicular to the transverse direction 120 along which the depth image 202 is taken, the bin segmentation module 204 can determine the bin pixels by comparing the distance of each pixel from the sensor 118 along the transverse direction 120 to a depth value threshold. In an example, the depth value threshold can be based on the bin height and/or the distance from the sensor 118 to the work surface along the transverse direction 120. By way of example, the depth value threshold can be defined as the distance from the camera 118 to the work surface or bottom end 111, such that pixels associated with distances along the transverse direction that are less than the depth value threshold are classified as bin pixels that represent the sides, in particular the top end 109 of the sides, of the bin 107.

Figure 7:
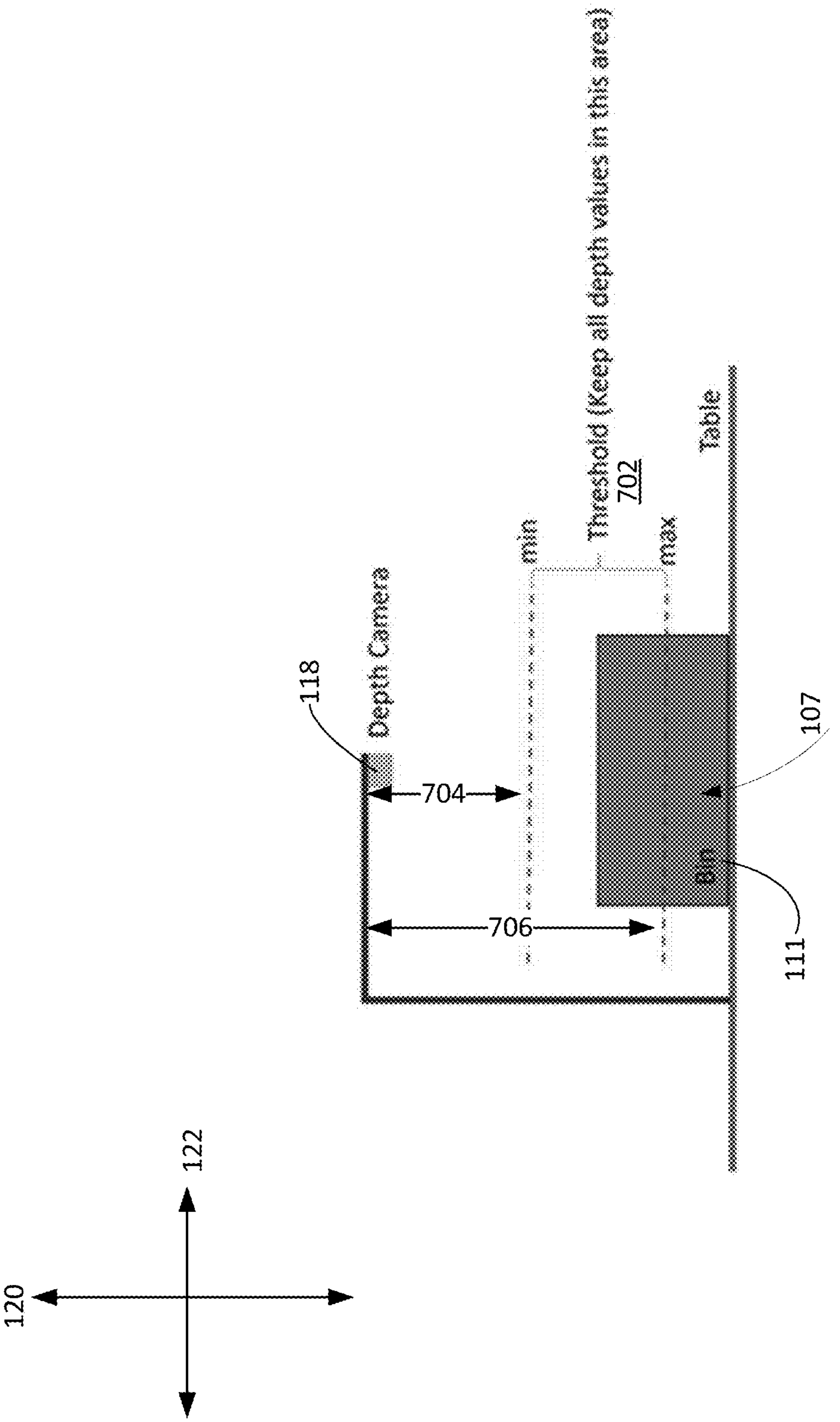
FIG. 7 is a side view of another example autonomous system, illustrating an example depth value threshold for determining bin pixels, in accordance with an example embodiment.

In some examples, referring to FIG. 7, a depth value threshold 702 is defined by dimensions of the bin 107 from the depth camera 118 along the transverse direction 120. In particular, the threshold 702 can define a minimum distance 704 from the depth camera 118 along the transverse direction 120, and a maximum distance 706 from the depth camera 118 along the transverse direction 120. In an example, the bin segmentation module 204 stores or keeps the values (e.g., as bin pixels) associated with pixels that are a distance from the camera 118 along the transverse direction 120 that is greater than the minimum distance 704 and less than the maximum distance 706, so as to be within the depth value threshold 702. In various examples, the minimum value 704 and the maximum value, and thus the threshold 702, can be computed as a ratio of the bin height.

Alternatively, or additionally, the bin segmentation module 204 can generate the pixel-wise segmentation mask 304 using an initial set of data frames that define an empty working area. For example, the camera 118 can capture an image of the physical environment 100 when there are no objects or bins in the environment 100, so as to define the initial set of data frames of the empty working area. Using the initial set of data frames, the bin segmentation module 204 can create a background model for each pixel. Thus, when the bin segmentation module 204 receives the depth image 302, the bin segmentation module 204 can classify each pixel in the depth image 302 as foreground, which defines the bin pixels, or background, which defines the working area or work surface pixels (working area), based on the pixel model. In such an example, the bin segmentation module 204 does not require or use the bin height or the distance to the as input. In some examples, Gaussian models can be used for each pixel, though it will be understood that other models can be used, and all such models are contemplated as being within the scope of this disclosure. In some examples, for instance when the camera 118 defines an RGB-D camera, the bin segmentation module 204 can process color data from the camera 118 to distinguish foreground pixels from background pixels, thereby classifying bin pixels. In particular, for example, the bin segmentation module 204 can learn a pixel-wise background model in the color domain, which can be particularly useful for bins that can be problematic for 3D sensors, for instance transparent bins, among others.

With continuing reference to FIGS. 1-3, the pose estimation module 206, at 212, can receive the pixel-wise segmentation mask 304 of the bin 107. Using pixel-wise segmentation masks, the pose estimation module 206 can generate pose estimations of bins. In particular, for example, using the pixel-wise segmentation mask 304, the pose estimation module 206 can calculate a bin pose of the bin 107 in 3D space, so as to determine a pose 306 of the bin 107, at 214. The pose 306 can define an orientation of the bin 107 within the workspace 100.

Figure 4:
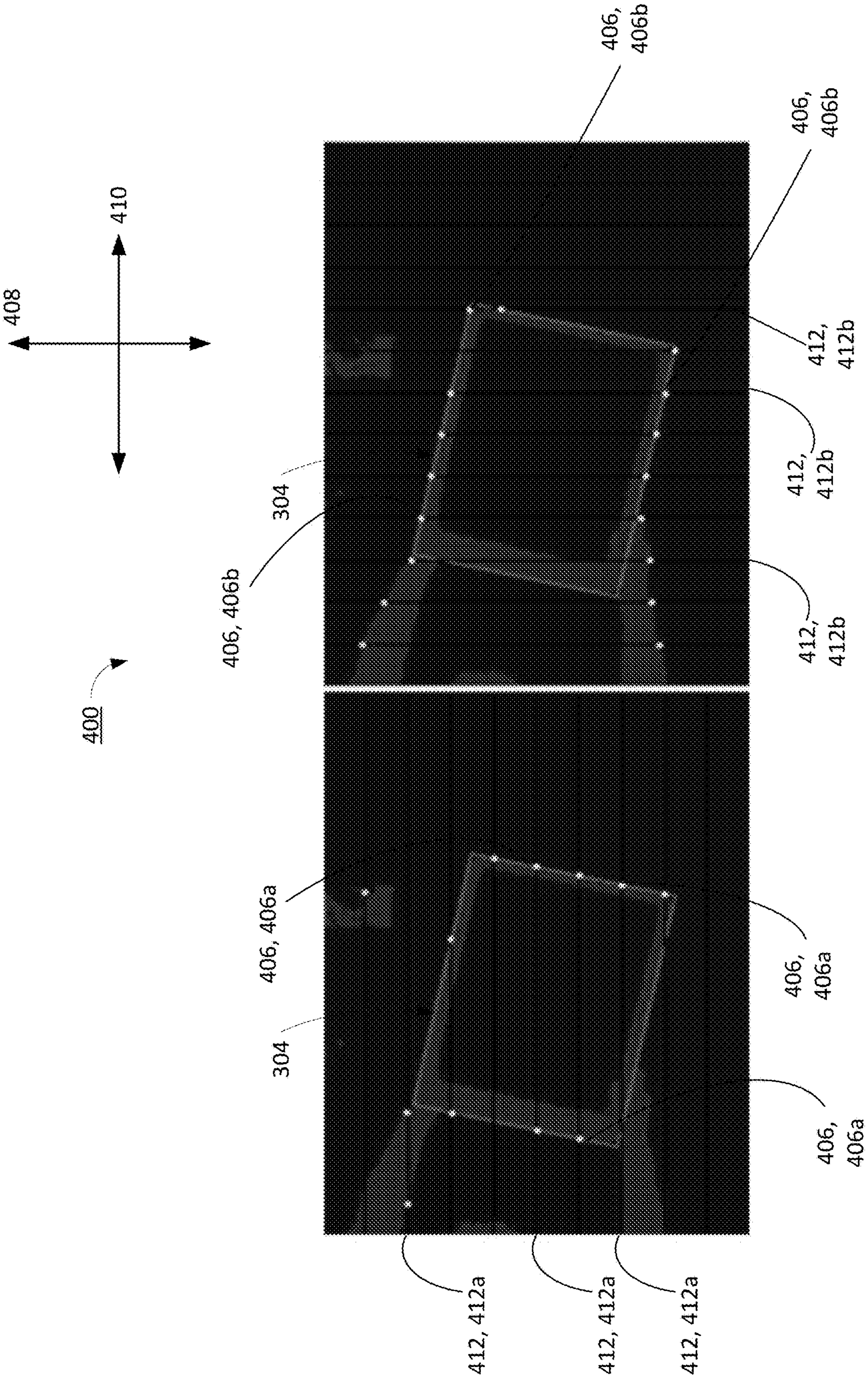
FIG. 4 illustrates processing on an example dataset object associated with the bin segmentation mask, so as to determine the pose estimation in accordance with an example embodiment.

In an example, to generate or determine the pose 306, the pose estimation module 206 fits a mathematical model to the outline of the bin 107 in the pixel-wise segmentation mask 304. In an example, the pixels associated with the top end 109 of the first side 113, second side 115, front end 117, and rear end 119 define the outline of the bin 107 in the pixel-wise segmentation mask 304. The outline of a given bin can be represented as a data object. For example, referring to FIG. 4, the outline of the bin 107 can be represented by a Dataset object 400 that can consist of points 406, or a set of points 406, sampled along the edge of the segmentation mask 304. In particular, the pose estimation module 206 can create the points 406 by scanning the mask 304 in a vertical direction 408 and a horizontal direction 410 that is substantially perpendicular to the vertical direction 410. Thus, the points 406 can include horizontal points 406*a* that are created from scanning the mask 304 along the horizontal direction 410, and vertical points 406*b* that are created from scanning the mask 304 along the vertical direction 408. The points 406 can define the outermost edges of the top end 109 of the bin 107 that are seen in a given scan line 412. For example, in some cases, the points 406*a* can define one or more, for instance first and last, edges of the sides of the bin 107 identified by the pose estimation module 206 along respective horizontal scan lines 412*a*, and the points 406*b* can define one or more, for instance first and last edges of the sides of the bin 107 identified by the pose estimation module 206 along respective vertical scan lines 412*b*.

In various examples, the pose estimation module 206 can fit a mathematical model to an outline of the given bin that is represented by points sampled along the edge of the segmentation mask associated with the bin, so as to generate the pose estimation. Referring also to FIG. 5, for example, the pose estimation module 206 can perform fitting operations 500 so as to fit a mathematical model to an outline of the bin 107 that is represented by the points 206 that are sampled along the edge of the segmentation mask 304. Various mathematical models can be used during the fitting operations 500, such as models that can represented by the ModelInterface object. By way of example, a rectangular model is used during the fitting operations 500, though it will be understood that alternatively shaped models can be used for alternatively shaped bins, and all such models are contemplated as being within the scope of this disclosure. It is recognized herein that the Dataset object 400 can include points that are not on the segmentation mask 304 of the bin 107. Such points can be referred to as outliers. It is further recognized herein due to the outliers or noise defined by the Dataset object 400, the pose estimation module 206 can perform the fitting operations 500 iteratively, for instance based on RANSAC, to fit the model. For example, the pose estimation module 206 can fit the given model to a randomly selected set of points. For an iteration in which the pose estimation module 206 finds a good fit in which there are inliers in the dataset that were not used to fit the model, the pose estimation module 206 can re-fit the model using all of its inliers, and can compute an overall error over all inliers. In various examples, pose estimation module 206 selects the model from a plurality of models associated with the lowest overall inlier error, as to define a selected model. The selected model can define the final fit to the dataset that includes the points 406, so as to define a fitted bin outline. Based on the fitted bin outline and calibration parameters intrinsic to the camera 118, the pose estimation module 206 can calculate or compute the estimated pose 306 of the bin 107 in 3D space. For example, with respect to the bin 107 that defines a rectangle, the pose estimation module 206 can determine or estimate the 3D position of each corner of the bin 107. Based on the 3D position of each corner, the pose estimation module 206 can determine or estimate the center position of the bin 107 and the orientation of the bin 107. Additionally, the pose estimation module 206 can check to access the correct detection of the bin is made on expected bin pose and dimensions.

Referring again to FIG. 2, at 214, the post-processing module 208 can receive the pose 306 from the post estimation module 206 so as to perform processing on the pose 306 that can be rendered on a depth map such that the depth map includes the estimated pose 306. The processing can vary based on the specific application performed by the system 200. For example, during a tray-stacking implementation, in some cases, no post-processing is performed after the pose 306 is generated. In an example bin-picking implementation, the post-processing module 208 can remove regions of the depth map that includes the pose 306, after the pose 306 is generated. The regions that are removed can be disposed outside of the bin 107 or part of the bin wall. To do so, the post-processing module 208 can rotate the depth map that includes the pose 306, so that the orientation of the bin 107 represented in the pose 306 is the same orientation as the axes of the depth image that includes pose 306. For example, the depth map that includes the pose 306 can be rotated so that the lateral direction 122 defined by the opposed sides 113 and 115 of the bin 107 is parallel to the horizontal direction 410 or vertical direction 408. By way of further example, the depth map that includes the pose 306 can be rotated so that the longitudinal direction 124 defined by the rear end 119 and the front end 117 of the bin 107 is parallel with the vertical direction 408 or horizontal direction 410. In an example, the depth map that includes the pose 306 is rotated so that the longitudinal direction 124 is parallel with one of the vertical direction 408 or the horizontal direction 410 and the lateral direction lateral direction 122 is parallel with the other of the vertical direction 408 or the horizontal direction 410. After rotating the depth map that includes the pose 306 so as define a rotated depth map, the post-processing module 208 can crop the rotated depth map so that only the interior of the bin 107, for instance the bottom end 111, is rendered on the rotated depth map, so as to define a rotated and cropped depth map. Such post-processing can enable a neural network to receive the rotated and cropped depth map as input, for instance so that grasp locations can be computed.

In some cases, a user can provide dimensions (e.g., length, width, height) to the system 200, so as to define input dimensions. In such examples, the post-processing module 208 can compare the input dimensions to dimensions defined by the pose 306. In an example, when the dimensions defined by the pose 306 are within a predetermined threshold (e.g., 5 to 10 percent) of the input dimensions, the post-processing module 208 can verify or validate that the pose 306 corresponds to the correct bin. When the dimensions defined by the pose 306 are outside the predetermined threshold of the input dimensions, the post-processing module 208 can determine that the pose estimation 306 corresponds to another bin or object that was captured by the depth camera 118 within the environment 100. It will be understood that the predetermined threshold an depend on the quality of the camera 118 or can otherwise vary as desired, and 5 to 10% is merely presented as an example.

In another example, after detecting the bin pose 306, the post-processing module 208 can estimate the bottom end 111 of the bin 107 using expected bin dimensions, for instance bin dimensions provided by a user. For example, the bin pose 306 can define corners in the depth frame. The post-processing module 208 can transform the corners to a 3D pose relative to the camera frame. Based on the height of the bin 107, the post-processing module 208 can compute the location of the corners defined by the bottom end 111. In some cases, the corners defined by the bottom end 111 define an area that is less than an area defined by the corners defined by the top end 109 of the bin 107. In some examples, the post-processing module 208 can transform the location of the corners defined by the bottom end 111 to 2D, so that it can be input into a grasp computation module to determine grasp points. In other examples, a given grasp system may use 3D points, such that the transformation to 2D is not performed.

As described herein, an autonomous system can include a robot configured to operate in an active industrial runtime so as to define a runtime. The robot includes an end effector configured to grasp a plurality of objects within a workspace. The autonomous system can include a depth camera configured to capture a depth image of the workspace. The autonomous system further includes a processor and a memory storing instructions that, when executed by the processor, cause the autonomous system to perform various operations. For example, the system can detect a bin within the workspace, wherein the bin is capable of containing one or more of the plurality of objects. Based on the depth image, the system can determine a pose of the bin. The pose can define an orientation of the bin within the workspace.

In an example, the bin defines a bottom end and a top end opposite the bottom end along a transverse direction, wherein the bottom end is positioned farther from the depth camera along the transverse direction as compared to the top end. The top end can define an opening and sides of the bin around the opening such that the depth camera is further configured to capture the depth image of the bin from a perspective along the transverse direction. Based on the depth image, the system can generate a segmentation mask of the bin that defines pixels representative of the sides of the bin at the top end. The system can scan the segmentation mask along a first direction and a second direction substantially perpendicular to the first direction so as to identify a plurality of points on outermost edges of the segmentation mask. Further, the system can fit a plurality of models to a boundary defined by the plurality of points, so as to determine the pose of the bin.

Thus, in accordance with various embodiments, bin poses can be determined or estimated without artificial markers being added to bins or without generating or obtaining accurate 3D models of bins. Furthermore, embodiments described herein define mechanisms that are computationally cheap and, in many cases, compatible with embedded hardware systems. Further still, fitting operations, such as the fitting operations 500, described herein can define model fitting that is robust to outliers, noisy data, and missing data (e.g., holes or occlusions in the depth map 302), such that embodiments are compatible with low-cost sensors and can operate in various (e.g., challenging) scenarios.

Figure 6:
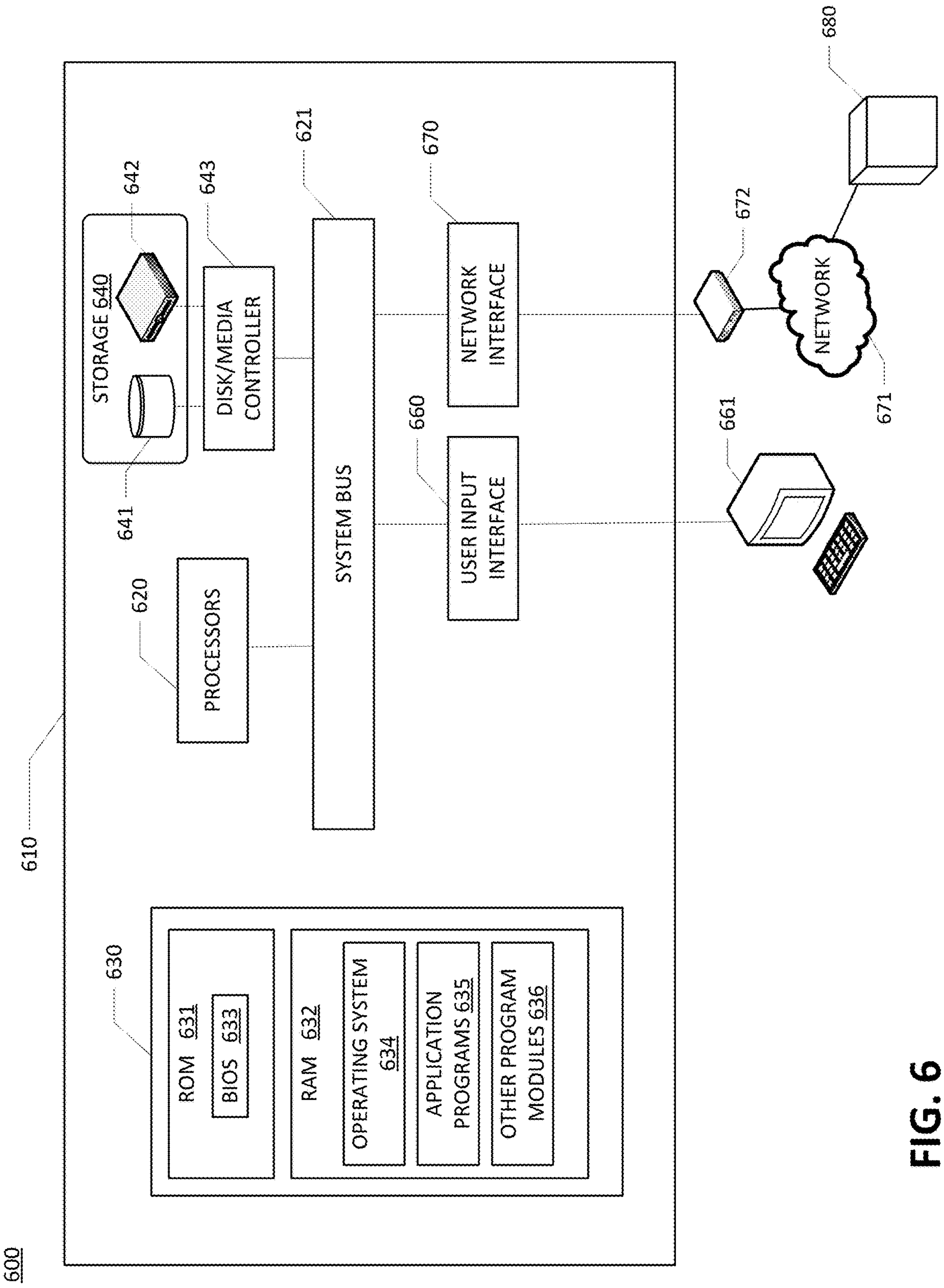
FIG. 6 illustrates a computing environment within which embodiments of the disclosure may be implemented.

FIG. 6 illustrates an example of a computing environment within which embodiments of the present disclosure may be implemented. A computing environment 600 includes a computer system 610 that may include a communication mechanism such as a system bus 621 or other communication mechanism for communicating information within the computer system 610. The computer system 610 further includes one or more processors 620 coupled with the system bus 621 for processing the information. The autonomous system 102, and thus the computing system 200, may include, or be coupled to, the one or more processors 620.

The processors 620 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 620 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 621 may include at least one of a system bus, a memory bus, an address bus, or a message bus, and may permit exchange of information (e.g., data (including computer-executable code), signaling, etc.) between various components of the computer system 610. The system bus 621 may include, without limitation, a memory bus or a memory controller, a peripheral bus, an accelerated graphics port, and so forth. The system bus 621 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 6, the computer system 610 may also include a system memory 630 coupled to the system bus 621 for storing information and instructions to be executed by processors 620. The system memory 630 may include computer readable storage media in the form of volatile and/or nonvolatile memory, such as read only memory (ROM) 631 and/or random access memory (RAM) 632. The RAM 632 may include other dynamic storage device(s) (e.g., dynamic RAM, static RAM, and synchronous DRAM). The ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system 633 (BIOS) containing the basic routines that help to transfer information between elements within computer system 610, such as during start-up, may be stored in the ROM 631. RAM 632 may contain data and/or program modules that are immediately accessible to and/or presently being operated on by the processors 620. System memory 630 may additionally include, for example, operating system 634, application programs 635, and other program modules 636. Application programs 635 may also include a user portal for development of the application program, allowing input parameters to be entered and modified as necessary.

The operating system 634 may be loaded into the memory 630 and may provide an interface between other application software executing on the computer system 610 and hardware resources of the computer system 610. More specifically, the operating system 634 may include a set of computer-executable instructions for managing hardware resources of the computer system 610 and for providing common services to other application programs (e.g., managing memory allocation among various application programs). In certain example embodiments, the operating system 634 may control execution of one or more of the program modules depicted as being stored in the data storage 640. The operating system 634 may include any operating system now known or which may be developed in the future including, but not limited to, any server operating system, any mainframe operating system, or any other proprietary or non-proprietary operating system.

The computer system 610 may also include a disk/media controller 643 coupled to the system bus 621 to control one or more storage devices for storing information and instructions, such as a magnetic hard disk 641 and/or a removable media drive 642 (e.g., floppy disk drive, compact disc drive, tape drive, flash drive, and/or solid state drive). Storage devices 640 may be added to the computer system 610 using an appropriate device interface (e.g., a small computer system interface (SCSI), integrated device electronics (IDE), Universal Serial Bus (USB), or FireWire). Storage devices 641, 642 may be external to the computer system 610.

The computer system 610 may also include a field device interface 665 coupled to the system bus 621 to control a field device 666, such as a device used in a production line. The computer system 610 may include a user input interface or GUI 661, which may comprise one or more input devices, such as a keyboard, touchscreen, tablet and/or a pointing device, for interacting with a computer user and providing information to the processors 620.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium of storage 640, such as the magnetic hard disk 641 or the removable media drive 642. The magnetic hard disk 641 (or solid state drive) and/or removable media drive 642 may contain one or more data stores and data files used by embodiments of the present disclosure. The data store 640 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 620 may also be employed in a multi-processing arrangement to execute the one or more sequences of instructions contained in system memory 630. In alternative embodiments, hard-wired circuitry may be used in place of or in combination with software instructions. Thus, embodiments are not limited to any specific combination of hardware circuitry and software.

As stated above, the computer system 610 may include at least one computer readable medium or memory for holding instructions programmed according to embodiments of the invention and for containing data structures, tables, records, or other data described herein. The term "computer readable medium" as used herein refers to any medium that participates in providing instructions to the processors 620 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 641 or removable media drive 642. Non-limiting examples of volatile media include dynamic memory, such as system memory 630. Non-limiting examples of transmission media include coaxial cables, copper wire, and fiber optics, including the wires that make up the system bus 621. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 600 may further include the computer system 610 operating in a networked environment using logical connections to one or more remote computers, such as remote computing device 680. The network interface 670 may enable communication, for example, with other remote devices 680 or systems and/or the storage devices 641, 642 via the network 671. Remote computing device 680 may be a personal computer (laptop or desktop), a mobile device, a server, a router, a network PC, a peer device or other common network node, and typically includes many or all of the elements described above relative to computer system 610. When used in a networking environment, computer system 610 may include modem 672 for establishing communications over a network 671, such as the Internet. Modem 672 may be connected to system bus 621 via user network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computing device 680). The network 671 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 671.

It should be appreciated that the program modules, applications, computer-executable instructions, code, or the like depicted in FIG. 6 as being stored in the system memory 630 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 610, the remote device 680, and/or hosted on other computing device(s) accessible via one or more of the network(s) 671, may be provided to support functionality provided by the program modules, applications, or computer-executable code depicted in FIG. 6 and/or additional or alternate functionality. Further, functionality may be modularized differently such that processing described as being supported collectively by the collection of program modules depicted in FIG. 6 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 3 may be implemented, at least partially, in hardware and/or firmware across any number of devices.

It should further be appreciated that the computer system 610 may include alternate and/or additional hardware, software, or firmware components beyond those described or depicted without departing from the scope of the disclosure. More particularly, it should be appreciated that software, firmware, or hardware components depicted as forming part of the computer system 610 are merely illustrative and that some components may not be present or additional components may be provided in various embodiments. While various illustrative program modules have been depicted and described as software modules stored in system memory 630, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An autonomous system configured to operate in an active industrial environment so as to define a runtime, the autonomous system comprising:

a robot defining an end effector configured to grasp a plurality of objects within a workspace, a depth camera configured to capture a depth image of the workspace;

one or more processors; and a memory storing instructions that, when executed by the one or more processors, cause the autonomous system to, during the runtime:

detect a bin within the workspace, the bin capable of containing one or more of the plurality of objects; and based on the depth image, determine a pose of the bin, the pose defining an orientation of the bin within the workspace;

based on the depth image, generate a segmentation mask of the bin, the segmentation mask defining pixels representative of sides of the bin at a top end of the bin;

scan the segmentation mask along a first direction and a second direction substantially perpendicular to the first direction so as to identify a plurality of points on outermost edges of the segmentation mask;

fit a plurality of models to a boundary defined by the plurality of points, so as to determine the pose of the bin.

2. The autonomous system as recited in claim 1, wherein the bin defines a bottom end and the top end opposite the bottom end along a transverse direction, the bottom end positioned farther from the depth camera along the transverse direction as compared to the top end, the top end defining an opening and the sides of the bin around the opening such that the depth camera is further configured to capture the depth image of the bin from a perspective along the transverse direction.

3. A method performed by an autonomous system that includes a robot operating in an active industrial environment so as to define a runtime, the method comprising:

capturing a depth image of a workspace of the robot;

based on the depth image, detecting a bin within the workspace, the bin capable of containing one or more of the plurality of objects; and based on the depth image, determining a pose of the bin, the pose defining an orientation of the bin within the workspace;

based on the depth image, generating a segmentation mask of the bin, the segmentation mask defining pixels representative of the sides of the bin at a top end of the bin;

scanning the segmentation mask along a first direction and a second direction substantially perpendicular to the first direction so as to identify a plurality of points on outermost edges of the segmentation mask;

fitting a plurality of models to a boundary defined by the plurality of points, so as to determine the pose of the bin.

4. The method as recited in claim 3, wherein the bin defines a bottom end and the top end opposite the bottom end along a transverse direction, the bottom end positioned farther from the depth camera along the transverse direction as compared to the top end, the top end defining an opening and the sides of the bin around the opening such that the depth camera is further configured to capture the depth image of the bin from a perspective along the transverse direction.

* * * * *